3,470,070
FLASHING VISCOUS POLYMER SOLUTIONS
Robert D. Heckart, Bartlesville, Okla., assignor to Phillips
Petroleum Company, a corporation of Delaware
Filed Dec. 6, 1966, Ser. No. 599,642
Int. Cl. B01d *3/06*
U.S. Cl. 203—88                                 4 Claims

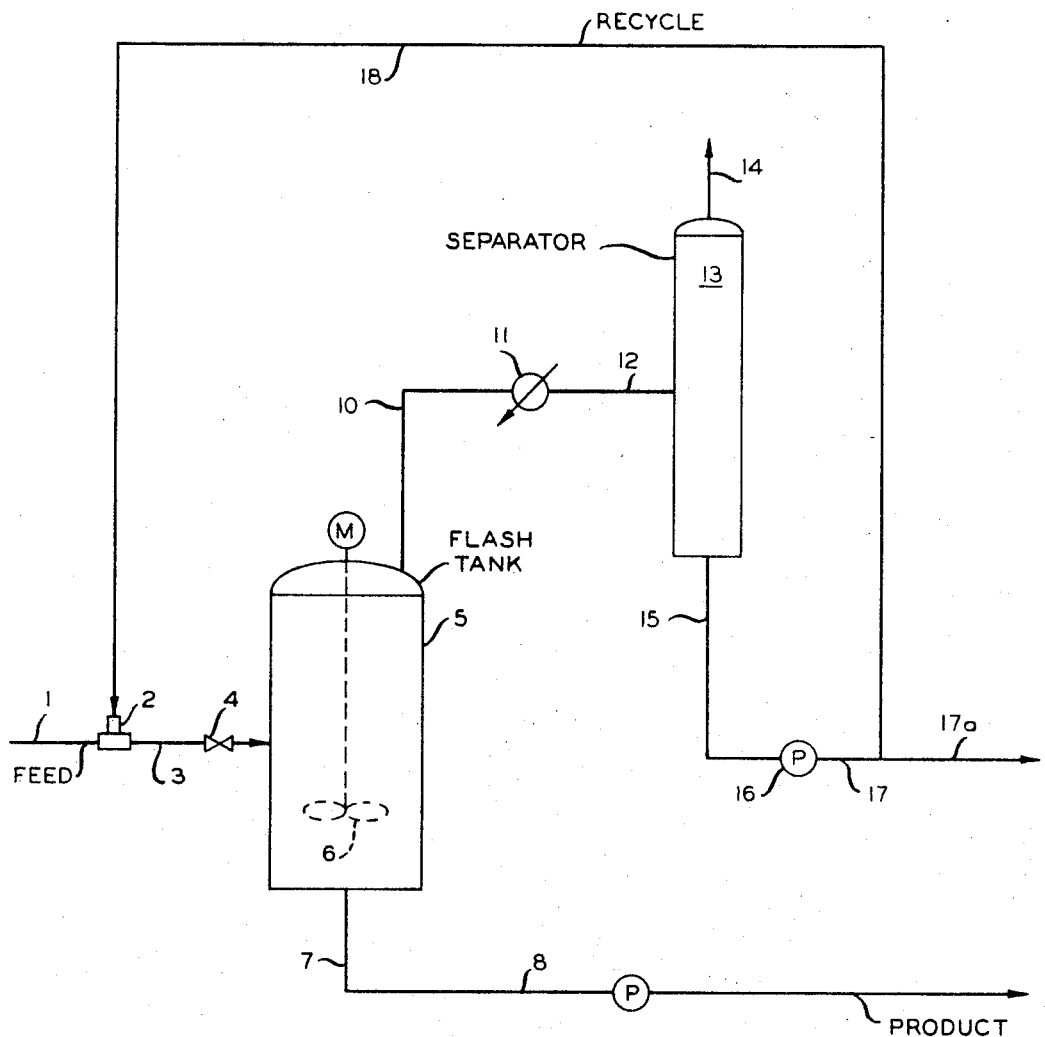

ABSTRACT OF THE DISCLOSURE

A solution of a polymer in a solvent, e.g., hydrogenated polybutadiene dissolved in hexane, is flashed at a desired flash tank pressure and the concentration of the remaining liquid is regulated to a desired value by recycling a portion of earlier flashed but now condensed hexane to the feed to the tank.

---

This invention relates to flash distillation control. In one of its aspects, it relates to a method for controlling a flash distillation. The invention also relates to an apparatus for effecting a controlled flash distillation. In one of its aspects, the invention relates to a method for controlling the amount of overhead in a flashing operation without however, changing the desired temperature at which the operation is employed. In another of its aspects, the invention relates to the provision of an apparatus for carrying out the method of the invention.

In one concept, the invention is a method for flashing a liquid into a zone of reduced pressure at a desired controlled temperature by admixing with the stream to be flashed a condensed portion of priorly flashed material or vapors. In a further concept, the invention is a method in which a solution of a polymer in a solvent is flashed at a desired tank pressure, the concentration of the remaining liquid being regulated to a desired level by recycling a portion of earlier flashed but now condensed solvent to the feed to the flashing zone. In another concept, the invention is a method as described in which the recycle solvent is added to the flash zone at a locus at which the flashing is initiated. In a further concept, the invention provides apparatus having in combination a flash vessel, means for feeding a solution to be flashed to said vessel, means upon the last mentioned means for regulating the pressure at which the solution is discharged into said flash vessel, means for removing a liquid bottoms from said flash vessel, means for taking off overhead vapors from said flash vessel, means for cooling and condensing overhead vapors to form at least a liquid phase and means for passing at least a portion of said liquid phase to said means for feeding.

In a more specific concept of the invention, a method of flash concentrating of a polymer dissolved in a solvent, for example, a hydrogenated polybutadiene dissolved in hexane, is flashed to produce a desired flashed or concentrated solution which can be readily handled by admixing liquid solvent with the feed prior to the completion of its flashing. The invention is also applicable to the concentration of other polymer solutions such as polyolefins, hydrogenated polyolefins, polybutadiene, butadiene-styrene copolymers, hydrogenated butadiene-styrene copolymers, etc.

In the chemical arts it is frequently necessary or desirable to flash concentrate a reaction mass as in the recovery of a polymer from a solution. Often the concentration of a solution and its subsequent handling are difficult due to the viscous character of the concentrate which is obtained and which may even deposit in or plug up the apparatus in which it is being concentrated when flashed to a necessary flash tank pressure as dictated by downstream processing equipment. For example, in the production of a hydrogenated polybutadiene there is obtained a solution, for example in normal hexane which if it were flashed to a desired flash tank pressure, 5 p.s.i.g., the solution would become so concentrated that it could not be handled. Cooling of the stream before flashing would reduce the amount of flashing and desired concentration would not be achieved. Further, since the stream is viscous, when cooling a low heat transfer rate would result and excessive surface for heat transfer would be required.

I have now found that by recycling at least a portion of the solvent stream obtained as overhead from the flashing, the temperature can be maintained at a desired value, yet nevertheless the concentration of the solution which has been flashed is a desirable one.

An object of the invention is to provide a method for the flash distillation of a liquid. Another object of the invention is to provide an apparatus for the flash distillation of a liquid. A further object of the invention is to provide a method for flash concentrating a solution, for example, a solution of a polymer in a solvent. Still a further object of the invention is to provide a method for the flash concentration of a solution, for example, a solution of a polymer in a solvent wherein the temperature and concentration of the flash solution, indeed the temperature of the flashing being effected, can be regulated without adversely affecting the concentration which must be maintained if difficulties due to viscous or sticky fluid are to be avoided. A further object of the invention is to provide a method for the concentration of a hydrogenated polybutadiene in a solvent in which it has been obtained, for example normal hexane. A still further object is to provide an apparatus wherein a polymer high solvent solution can be flash evaporated.

Other concepts, objects and the several advantages of this invention will be apparent to one skilled in the art from a study of the drawing, the disclosure and the appended claims.

According to the present invention, the amount of solvent flashing overhead, and, therefore, the concentration of polymer solution bottoms as in the recovery of a hydrogenated polybutadiene or other polymer or material, are controlled for recycling a portion of the condensed solvent. In one form of the invention, the overhead which is returned to the operation is returned to a point at which the feed fed to the flash unit is initially flashing.

Also according to the invention, there is provided an apparatus for flash distillation comprising in combination with the usual elements, means for returning to the flashing to a point in the line of flow before flashing is completed a portion of condensed overhead.

The condensate returned for admixture with the feed can be admixed in a mixing zone or stirred vessel with the feed at a point well prior to the point at which pressure is reduced on the feed. In addition, part of it can be passed into admixture with the feed as the feed is being flashed to or just downstream of a flashing or feed valve feeding the liquid to the flash unit or tank. One skilled in the art in possession of this disclosure having studied the same will recognize that the invention has wide applicability in the distillation evaporation or concentration art. However, the invention is particularly applicable to that situation in which careful control of the concentration of the residual liquid is required to avoid problems attendant upon viscosity or stickiness. One such situation is in the recovery of solvent and hydrogenated polybutadiene from a hydrogenation zone effluent in which polybutadiene is hydrogenated employing a solvent such as normal hexane.

Referring now to the drawing, polybutadiene hydrogenation effluent feed 1 is passed to mixing zone 2 and by 3 and expansion valve 4 to flash tank 5 equipped with stirrer element 6. Mixing zone 2 comprises an inline mixing pump for intimate blending of streams 1 and 18. Concentrated bottoms from which solvent has been desirably flashed are passed by 7 and 8 to blend tank or other storage or further treatment or utilities as desired.

The invention is particularly applicable to that situation in which steam stripping of the concentrated solution from 8 is practiced at a low pressure and it is necessary to operate the flash chamber at the same low pressure as the steam strippers. When passage of the hot solution from the high temperature, high pressure reactor into the low flash pressure vessel would result in vaporization of too much solvent with the result that the solution or concentrate from vessel 5 would be too viscous to be received and treated in the steam strippers. In the case of the specific example herein set forth, it is not feasible to cool the feed to the flash to reduce the amount of flashing because the resulting polymer solution would foul heat exchangers if used and other portions of the apparatus down stream from the cooling.

Overhead from flash tank 5 passes by 10 through cooler 11 and by 12 to gas separator 13 from which gases are flared by 14 or otherwise disposed of as may be desired. Liquid from separator 13 is passed by 15, pump 16, and 17 and 17a to solvent storage. A portion of the solvent in 17 is passed by 18 to mixing zone 2. A portion of the solvent also can be passed to a point just ahead or at the expansion valve 4, a point downstream of valve 4 but before the feed enters flash tank 5, or by a spray ring in the flash tank at the point at which the flashing stream enters this tank.

The table shows the principal streams and their compositions as these result from the flash concentration of a hydrogenation reaction effluent resulting from a reaction in which the components as indicated have been employed. Temperatures and pressures of the streams are included to illustrate the temperature reduction of the hot reaction effluent by the addition of cool recycle solvent and hence the reduction in the amount of flash concentration. The reaction effluent is thus concentrated from 11.2 to 19.9 weight percent polymer. A concentration of about 20 weight percent polymer is desired for optimum performance of downstream processing equipment. Without use of my invention, i.e., by direct flashing of the reaction effluent at 350° F. and 200 p.s.i.g. into the flash vessel which must be operated at the same low pressure (5 p.s.i.g.) as the downstream equipment, the polymer solution would flash to a concentration exceeding 30 weight percent. This concentration is too high, i.e., the solution is too viscous for efficient downstream processing.

Reasonable variation and modification are possible within the scope of the foregoing disclosure, the drawing and the appended claims to the invention, the essence of which is that a method of controlling flash distillation or evaporation, for example of a polymer solution, by returning a portion of condensed overhead to the feed and/or to the flashing feed, and an apparatus for so doing comprising at least means for returning the condensed overhead from the flash operation as described have been provided.

I claim:

1. A method for flashing at a desired temperature and to substantially reduced pressure for further treatment in a downstream zone a solution of a viscous polymer such as a solution of hydrogenated polybutadiene dissolved in a solvent such as normal hexane, the polymer having been produced in a reaction zone, said solution upon flashing of the same at a desired lower flashing temperature and desired pressure which is substantially lower than the pressure at which said polymer is taken from said reaction zone and is substantially as low as the pressure in said downstream zone in which said polymer is further treated, being too viscous after flashing at said conditions and, therefore, difficult to handle as by pumping and to effect desirable heat transfer therefrom when so flashed, to concentrate the same without cooling the same yet while avoiding rendering the concentrate formed too viscous which comprises passing said solution into a flashing zone maintained at a reduced pressure, removing concentrate from said flashing zone, taking off flashed solvent vapors off as overhead from said flashing zone, cooling and condensing at least a portion of said solvent vapors and admixing at least a portion of the condensed solvent vapors with the feed to said flashing zone immediately prior to flashing in a manner in an amount and at a temperature such that a control of the flashing and concentration in said zone is accomplished at said desired temperature without rendering the concentrate thus formed too viscous.

2. A method for concentrating a feed solution of a viscous hydrogenated polybutadiene dissolved in a hexane solvent in which the polybutadiene has been hydrogenated, said polymer being too viscous after flashing at conditions herein stated to be properly further handled which comprises passing said solution at a temperature of the order of about 350° F. and under a pressure of the order of about 200 pounds per square inch gauge into a flashing zone maintained at a pressure of the order of about 5 pounds per square inch gauge, in said zone flashing said solution, condensing solvent vapors thus obtained and

TABLE

| | 1 | 3 | 8 | 10 | 14 | 17 | 17a | 18 |
|---|---|---|---|---|---|---|---|---|
| | Reactor effluent | Feed to flash tank | Product to blend tanks | Flash tank vapor | Hydrogen separator vapor | Hydrogen separator liquid | n-Hexane to dry solvent tank | Solvent recycle to flash tank |
| Hydrogen | 64 | 64 | | 64 | 64 | | | |
| n-Hexane | 829,943 | 1,080,943 | 421,467 | 658,660 | 1,660 | 657,000 | 406,000 | 251,000 |
| Hydrogenation catalyst | 757 | 757 | 757 | | | | | |
| Hydrogenated polybutadiene | 105,041 | 105,041 | 105,041 | | | | | |
| Hydrogen impurities | 5,085 | 5,085 | | 5,085 | 5,085 | | | |
| Total lbs./SD | 940,890 | 1,191,890 | 527,265 | 663,809 | 6,809 | 657,000 | 406,000 | 251,000 |
| Polybutadiene conc., wt. percent | 11.2 | 8.8 | 19.9 | | | | | |
| Temperature, °F | 350 | 295 | 170 | 170 | 100 | 100 | 100 | 100 |
| Pressure, p.s.i.g | 200 | 200 | 5 | 5 | 0 | 0 | 200 | 200 |

It will be evident to one skilled in the art in possession of this disclosure and having studied the same that the return of a part of the solvent stream which has been cooled to a desired appropriate temperature dilutes the feed to a new composition. This recycle stream can be varied in volume and in temperature to obtain a desired range of concentrations for the flash tank bottoms depending upon the material or composition of any generally specific material which may be concentrated employing the invention.

returning with said feed immediately before it is flashed to said zone to be present together with said solution as it is flashed in said zone, a portion of the condensed solvent vapors in a proportion such that the concentration of the solution upon flashing will be of the order of about 20 weight percent hydrogenated polybutadiene thus rendering the viscosity of said polymer which has thus been concentrated such that it can be properly handled.

3. A method according to claim 1 wherein a solution of hydrogenated polybutadiene is concentrated.

4. A method according to claim 1 wherein at least a part of said condensed solvent vapor is injected into said flash zone at the point at which the feed is flashed into said zone.

References Cited

UNITED STATES PATENTS

| | | | |
|---|---|---|---|
| 2,786,047 | 3/1957 | Jones et al. | 260—94.7 |
| 2,964,513 | 12/1960 | Dale | 260—94.9 |
| 2,964,516 | 12/1960 | Henderson. | |
| 3,356,662 | 12/1967 | Anderson et al. | 260—94.9 X |
| 2,367,862 | 1/1945 | Gormly | 203—98 X |
| 2,593,931 | 4/1952 | Stearns | 203—98 X |
| 2,744,939 | 5/1956 | Kennel | 203—88 X |
| 2,953,557 | 9/1960 | Wride et al. | 260—94.7 X |
| 2,994,644 | 8/1961 | Clay | 203—98 |
| 3,036,057 | 5/1962 | Wallace | 260—94.7 X |
| 3,320,220 | 5/1967 | Drusco et al. | 260—94.7 X |
| 3,330,875 | 7/1967 | Cull et al. | 260—94.7 X |

NORMAN YUDKOFF, Primary Examiner

F. E. DRUMMOND, Assistant Examiner

U.S. Cl. X.R.

203—98; 260—94.7